US011993246B2

(12) United States Patent
Kuriyagawa et al.

(10) Patent No.: US 11,993,246 B2
(45) Date of Patent: May 28, 2024

(54) WORK MACHINE

(71) Applicant: HONDA MOTOR CO., LTD., Tokyo (JP)

(72) Inventors: Koji Kuriyagawa, Wako (JP); Norikazu Shimizu, Wako (JP); Nobuo Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 882 days.

(21) Appl. No.: 17/021,368

(22) Filed: Sep. 15, 2020

(65) Prior Publication Data
US 2020/0406885 A1 Dec. 31, 2020

Related U.S. Application Data

(63) Continuation of application No. PCT/JP2018/011204, filed on Mar. 20, 2018.

(51) Int. Cl.
B60W 20/10 (2016.01)
A01D 34/64 (2006.01)
(Continued)

(52) U.S. Cl.
CPC ............. B60W 20/10 (2013.01); A01D 34/64 (2013.01); A01D 69/02 (2013.01); A01D 69/08 (2013.01);
(Continued)

(58) Field of Classification Search
CPC ...... B60K 2006/268; B60K 6/24; B60K 6/26; B60K 6/38; B60W 20/10; B60W 20/20;
(Continued)

(56) References Cited

U.S. PATENT DOCUMENTS 5,834,910 A 11/1998 Tsurumi et al.
6,810,986 B2 11/2004 Takagi
(Continued)

FOREIGN PATENT DOCUMENTS

JP 3296729 B2 7/2002
JP 2004343827 A 12/2004
(Continued)

OTHER PUBLICATIONS

International Search Report for PCT/JP2018/011204 mailed May 29, 2018.

Primary Examiner — Jeffrey J Restifo
(74) Attorney, Agent, or Firm — Thomas| Horstemeyer, LLP

(57) ABSTRACT

A work machine comprising a work unit that performs work on a travel path, an internal combustion engine configured to generate power for driving the work unit, a traveling unit including a front wheel and a rear wheel, an electric motor configured to generate power for driving a first wheel of the front wheel and the rear wheel, a first clutch for switching between transmission and discontinuation of the power from the internal combustion engine to a second wheel of the front wheel and the rear wheel, and a switching control unit configured to control the first clutch based on a power consumption of the electric motor for switching between the transmission and the discontinuation.

17 Claims, 8 Drawing Sheets

(51) Int. Cl.
    *A01D 69/02*     (2006.01)
    *A01D 69/08*     (2006.01)
    *B60K 6/24*     (2007.10)
    *B60K 6/26*     (2007.10)
    *B60K 6/387*     (2007.10)
    *B60W 20/40*     (2016.01)
    *A01D 101/00*     (2006.01)

(52) U.S. Cl.
    CPC ............ *B60K 6/24* (2013.01); *B60K 6/26* (2013.01); *B60K 6/387* (2013.01); *B60W 20/40* (2013.01); *A01D 2101/00* (2013.01); *B60W 2300/156* (2013.01); *B60Y 2200/223* (2013.01); *B60Y 2200/92* (2013.01); *B60Y 2300/42* (2013.01)

(58) Field of Classification Search
    CPC ... B60W 20/40; A01D 34/64; A01D 34/6812; A01D 69/02; A01D 69/025; A01D 69/08
    See application file for complete search history.

(56) References Cited

U.S. PATENT DOCUMENTS

| | | | |
|---|---|---|---|
| 6,949,898 B2 | 9/2005 | Inui et al. | |
| 7,610,975 B1 * | 11/2009 | Gust | A01D 34/44 180/65.245 |
| 9,837,948 B2 | 12/2017 | Kazuno | |
| 10,058,031 B1 * | 8/2018 | Brown | B60K 17/14 |
| 10,239,517 B2 | 3/2019 | Miyamoto et al. | |
| 2003/0178245 A1 | 9/2003 | Takagi | |
| 2004/0222757 A1 * | 11/2004 | Inui | B60L 50/12 318/146 |
| 2004/0227348 A1 * | 11/2004 | Wakitani | B60W 10/26 290/31 |
| 2009/0000839 A1 * | 1/2009 | Ishii | B62D 11/04 701/41 |
| 2010/0005768 A1 * | 1/2010 | Silbernagel | A01D 69/08 56/10.2 R |
| 2010/0206649 A1 * | 8/2010 | Ishii | B60K 7/0015 310/156.35 |
| 2012/0159916 A1 * | 6/2012 | Ishii | B60L 1/003 56/10.2 G |
| 2012/0227368 A1 * | 9/2012 | Koike | A01D 69/02 56/10.2 A |
| 2012/0227369 A1 * | 9/2012 | Koike | B60L 1/003 318/474 |
| 2013/0066496 A1 * | 3/2013 | Ishii | B60W 30/1888 903/930 |
| 2013/0268165 A1 * | 10/2013 | Hashima | A01D 34/80 701/50 |
| 2014/0013722 A1 * | 1/2014 | Pitcel | B60W 20/20 180/65.23 |
| 2015/0322645 A1 * | 11/2015 | Miyamoto | E02F 3/422 180/65.245 |
| 2016/0024754 A1 * | 1/2016 | Miyamoto | B60W 20/10 903/902 |
| 2016/0355186 A1 * | 12/2016 | Kanitz | B62D 1/187 |
| 2017/0088011 A1 * | 3/2017 | Li | B60W 10/28 |
| 2017/0264228 A1 | 9/2017 | Kazuno | |
| 2017/0265395 A1 * | 9/2017 | Kuriyagawa | F02D 13/06 |
| 2017/0282905 A1 | 10/2017 | Miyamoto et al. | |
| 2018/0352736 A1 * | 12/2018 | Kulkarni | A01D 34/47 |
| 2019/0387670 A1 * | 12/2019 | Matsuda | B60W 60/0053 |
| 2020/0404848 A1 * | 12/2020 | Kuriyagawa | B60W 20/20 |
| 2020/0406885 A1 * | 12/2020 | Kuriyagawa | B60W 10/02 |
| 2021/0155222 A1 * | 5/2021 | Taitz | B60W 20/15 |
| 2022/0227351 A1 * | 7/2022 | McKinzie | B60W 20/40 |

FOREIGN PATENT DOCUMENTS

| | | |
|---|---|---|
| JP | 2004350475 A | 12/2004 |
| JP | 3674919 B2 | 7/2005 |
| JP | 4014523 B2 | 11/2007 |
| JP | 2015085783 A | 5/2015 |
| JP | 2015229365 A | 12/2015 |
| JP | 2016144245 A | 8/2016 |
| JP | 2017158448 A | 9/2017 |
| JP | 2017178055 A | 10/2017 |
| JP | 6228620 B2 | 11/2017 |
| WO | 2019180851 A1 | 9/2019 |

\* cited by examiner

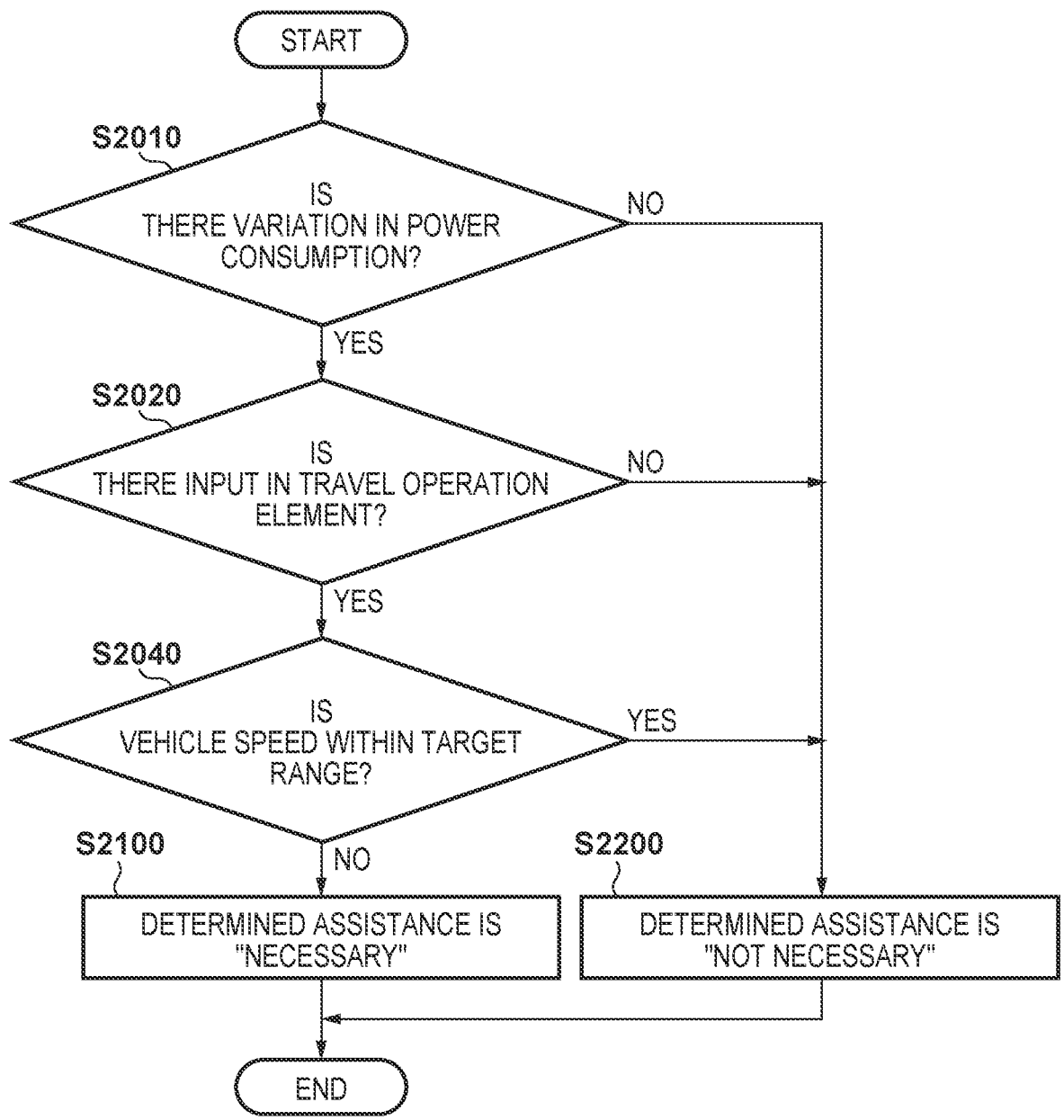

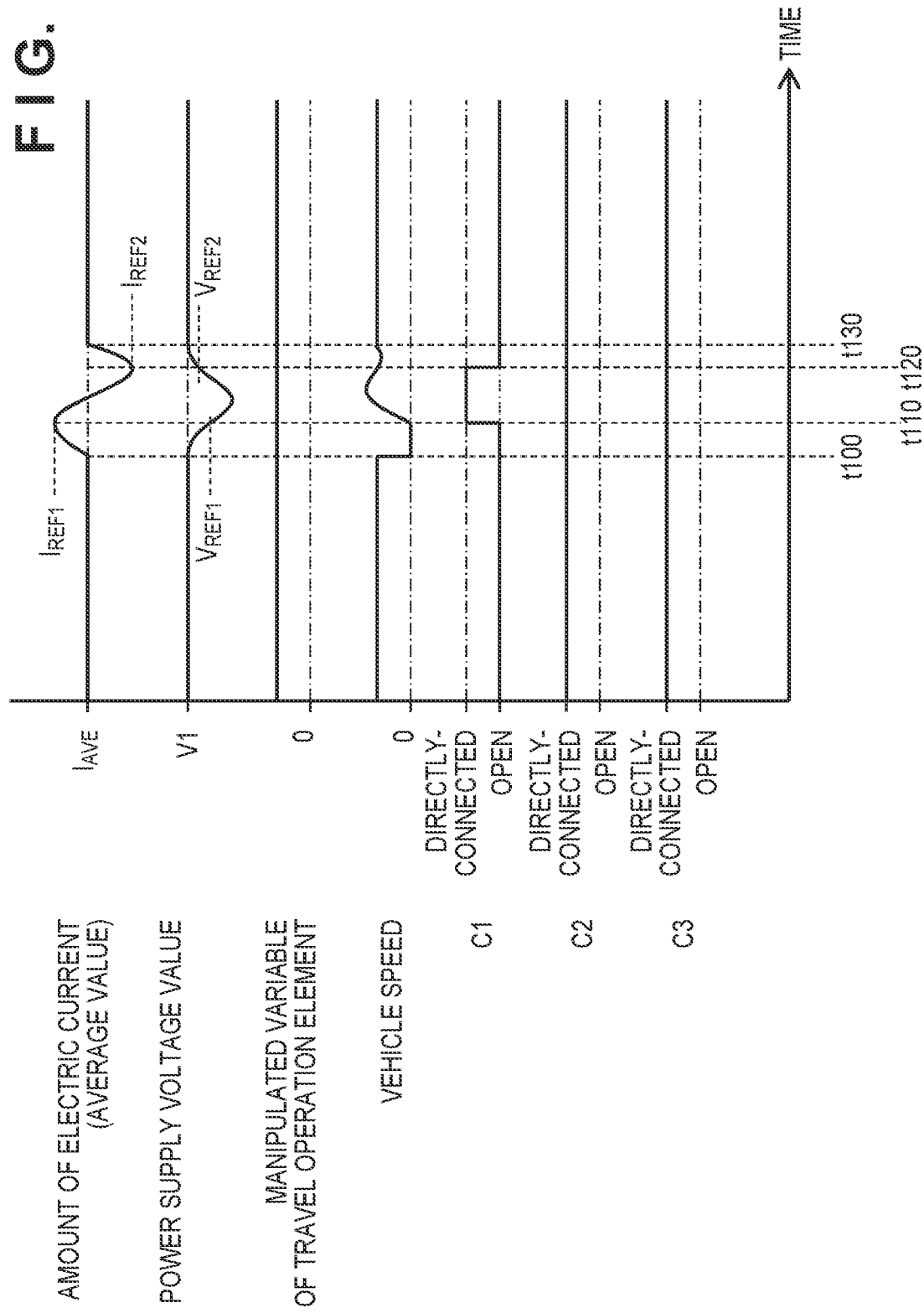

ial Patent
WORK MACHINE

CROSS-REFERENCE TO RELATED APPLICATION(S)

This application is a continuation of International Patent Application No. PCT/JP2018/011204 filed on Mar. 20, 2018, the entire disclosure of which is incorporated herein by reference.

TECHNICAL FIELD

The present invention relates to a work machine such as a lawnmower.

BACKGROUND ART

PTL1 describes an outdoor work apparatus provided with work equipment, 2 power sources including an engine and a motor, 4 wheels including right and left front wheels and right and left rear wheels, and an assist unit. According to PTL1, the 4 wheels are driven by one of the power sources under normal conditions (normal traveling). When a load applied on the one of the power sources increases, power from the other of the power sources is transmitted to the 4 wheels by the assist unit to assist the one of the power sources to drive (assisted traveling).

CITATION LIST

Patent Literature

PTL1: Japanese Patent Laid-Open No. 2017-158448

SUMMARY OF INVENTION

Technical Problem

According to PTL1, power from one, the other, or both of the 2 power sources is transmitted to the 4 wheels including right and left front wheels and right and left rear wheels, which may be a cause of complexity, increase in size, increase in weigh or the like of the vehicle body structure. Accordingly, there has been room for structural improvement.

An object of the present invention is to provide a vehicle body structure of a work machine capable of switching between normal traveling and assisted traveling in a relatively simple configuration.

Solution to Problem

An aspect of the present invention relates to a work machine. The work machine includes: a work unit that performs work on a travel path; an internal combustion engine configured to generate power for driving the work unit; a traveling unit including a front wheel and a rear wheel; an electric motor configured to generate power for driving a first wheel of the front wheel and the rear wheel; and a first clutch for switching between transmission and discontinuation of the power from the internal combustion engine to a second wheel of the front wheel and the rear wheel.

Advantageous Effects of Invention

According to the present invention, it is possible to provide a vehicle body structure of a work machine capable of switching between normal traveling and assisted traveling in a relatively simple configuration.

BRIEF DESCRIPTION OF DRAWINGS

FIG. 4B is a flow chart for illustrating an example of a method for determining whether or not assistance is required.

FIG. 5 is a timing chart for illustrating an example of a control method for a work machine.

DESCRIPTION OF EMBODIMENTS

Figure 1:
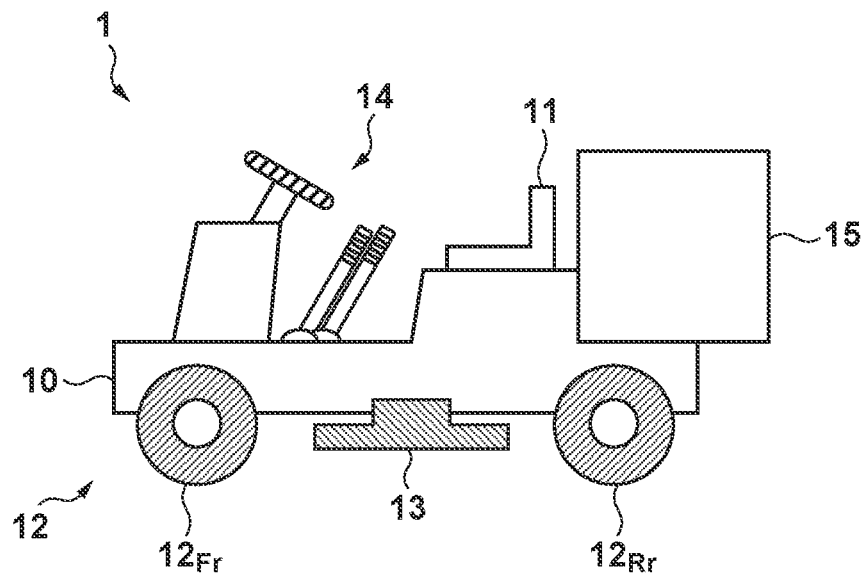
FIG. 1 is a schematic view for illustrating an example of a vehicle body structure of a work machine.

Hereinafter, embodiments of the present invention will be described with reference to the attached drawings. The attached drawings are only schematics illustrating the structure or the configuration of the embodiments, and dimensions of members illustrated in the drawings are not intended to reflect actual dimensions. Furthermore, in the attached drawings, the same reference numerals are given to the same or similar elements, and redundant description thereof is omitted herein.

FIG. 1 is a schematic view illustrating a vehicle body structure of a work machine 1 according to an embodiment. In the embodiment, the work machine 1 is assumed to be a passenger vehicle in which a seat 11 available for an operator to sit is provided on a vehicle body 10. The work machine 1 includes a traveling unit 12, a work unit 13, an operation unit 14, and a container unit 15.

The traveling unit 12 includes a front wheel $12_{Fr}$ and a rear wheel $12_{Rr}$ arranged in the lower part of the vehicle body 10 and enables the work machine 1 to travel with the wheels. In the embodiment, the work machine 1 is assumed to be a quadricycle provided with right-and-left pairs of the front wheels $12_{Fr}$ and the rear wheels $12_{Rr}$, respectively. However, the number of wheels is not limited to the example; in other words, the traveling unit 12 may include more than one wheels spaced apart in a vehicle body longitudinal direction.

The work unit 13 is a mechanism for performing work on a travel path, and is assumed to be a lawn mowing unit for lawn mowing work (hereinafter referred to simply as "work") in the embodiment. Although detailed description is omitted here, an example of the lawn mowing unit includes a disk-shaped cutter blade provide in a rotatable and liftable manner. The cutter blade can be rotated to mow the lawn in a work area, and the height of the cutter blade can be adjusted for a desired height of the lawn.

The operation unit 14 includes, for example, a travel operation element, a steering operation element, and a work operation element. An operator (passenger) on the seat 11 operates the travel operation element to cause the work machine 1 to travel forward or backward, for example. The operator also operates the steering operation element to cause the work machine 1 to change its traveling direction, for example, to the left, to the right, to turn around, or the like. In the work area, the operator also operates the work operation element to drive the work unit 13 to start working. Although a steering wheel and levers are illustrated in the figure, any other operation elements such as a pedal and a switch may be arranged.

The container unit 15 contains grasses cut by the work unit 13. For example, grasses cut by the work unit 13 are directed to and stored in the container unit 15 through a chuter, which is not illustrated, provided in the vehicle body 10.

Figure 2:
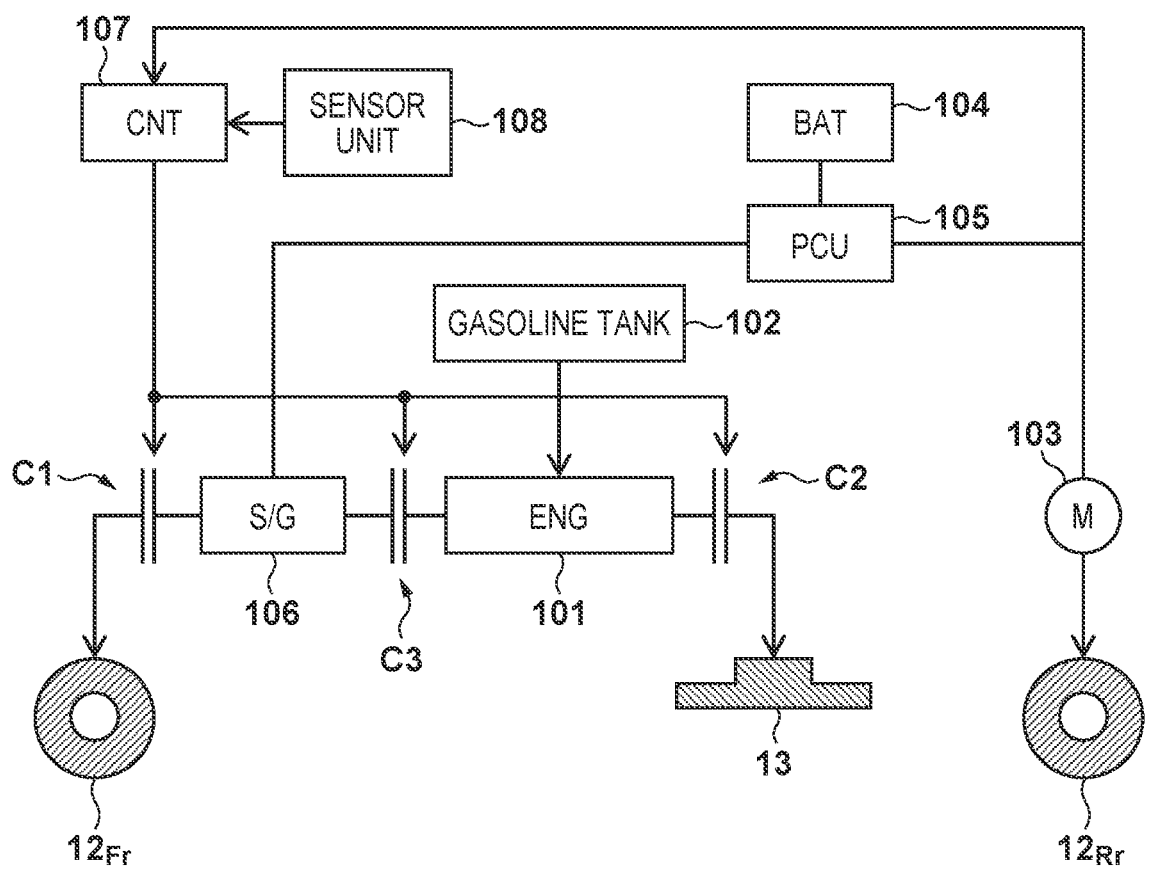
FIG. 2 is a block diagram for illustrating an example of a system configuration of the work machine.

FIG. 2 is a block diagram illustrating a system configuration of the work machine 1. The work machine 1 further includes an internal combustion engine (engine) 101, a gasoline tank (or, a petrol tank) 102, an electric motor 103, a battery 104, a power control unit 105, a starter-generator 106, a controller 107, and a sensor unit 108. Here, the work machine 1 is considered as a hybrid work machine provided with 2 power sources: the engine 101 and the electric motor 103.

The engine 101 receives fuel (gasoline, or petrol) from the gasoline tank 102 to generate power for driving the work unit 13. The engine 101 used in the embodiment is typically of a vertical type (in which the output shaft is in a vertical direction/vehicle body up-down direction) provided with a speed governor (governor). Alternatively, depending of specifications or the like of the work machine 1, the engine 101 to be used may be of a horizontal type (in which the output shaft is in a horizontal direction) and any suitable engine may be used among various types of engine.

The electric motor 103 receives electric power from the power control unit 105 to generate power for driving the rear wheel $12_{Rr}$. Typically, an AC motor such as a 3-phase motor may be used for the electric motor 103. Alternatively, depending of specifications or the like of the work machine 1, the electric motor 103 to be used may be a DC motor and any suitable motor may be used among various types of motor.

A rechargeable secondary battery is used for the battery 104 and examples include a lithium-ion battery and a nickel metal hydride battery. The power control unit 105 has functions of converting an AC voltage to a DC voltage, converting a DC voltage to an AC voltage, converting voltage levels, or the like, and, supplies electric power, for example, from the battery 104 to the electric motor 103. Here, the starter-generator 106 functions both as a starter that aids the engine 101 in starting and as a generator that generates electric power based on power from the engine 101. The power control unit 105 is also able to charge the battery 104 based on the electric power generated by the starter-generator 106.

Clutches C1 to C3 are arranged in a power transmission path of the engine 101. In the embodiment, the clutch C1 is arranged between the engine 101 and the front wheel $12_{Fr}$, and the clutch C2 is arranged between the engine 101 and the work unit 13. The starter-generator 106 is also arranged between the clutch C1 and the engine 101, and the clutch C3 is arranged between the starter-generator 106 and the engine 101.

The controller 107 can control the clutches C1 to C3. In other words, the controller 107 functions as a switching control unit capable of switching between transmission and discontinuation of power by the clutches C1 to C3. For example, when the clutch C2 is in a connected state, power is transmitted from the engine 101 to the work unit 13 to start working. On the other hand, when the clutch C2 is in an open state, power from the engine 101 to the work unit 13 is discontinued, the work is stopped or suspended.

When the clutch C3 is in a connected state, for example, power is transmitted from the engine 101 to the starter-generator 106, and electric power is generated by the starter-generator 106. In other words, the clutch C3 can be controlled to switch the operation mode of the starter-generator 106 to an electric power generation mode or a non-electric power generation mode, so that the electric power generation by the starter-generator 106 can be performed or prevented as necessary. Once the clutch C3 is in an open state, the starter-generator 106 is placed into the non-electric power generation mode, and in that case, a load on the engine 101 is reduced.

In addition, as described in detail later, once the clutch C1 is in a connected state, power is transmitted from the engine 101 to the front wheel $12_{Fr}$. On the other hand, when the clutch C1 is in an open state, the front wheel $12_{Fr}$ functions as a driven wheel.

According to the arrangement of the clutches C1 to C3 as described above, the power transmission path of the engine 101 with each of the front wheel $12_{Fr}$, the work unit 13, and the starter-generator 106 can be formed in a desired manner in a relatively simple configuration while avoiding an excessively complex vehicle body structure. Note that a directly-connected state of the clutches C1 to C3 is also represented as a transmission state (power transmission state), and an open state is also represented as a discontinuation state (power discontinuation state).

The sensor unit 108 includes a pluralism of sensors, and includes various types of sensors, such as a vehicle speed sensor, an acceleration sensor, and a gyro sensor, in addition to a manipulated variable detection sensor that detects a manipulated variable (or, an operation amount) which is input to the operation unit 14 (such as the travel operation element), for example. As described in detail later, the controller 107 can control the clutches C1 to C3 based on signals from the power control unit 105 and the sensor unit 108.

With the configuration as described above, the work machine 1 can selectively perform normal traveling in which the rear wheel $12_{Rr}$ is driven by the power from the electric motor 103 to travel and assisted traveling in which the front wheel $12_{Fr}$ is driven by the power from the engine 101 additionally to assist the normal traveling. In other words, during assisted traveling, the front wheel $12_{Fr}$ is to be driven by the power from the engine 101 in addition to driving the rear wheel $12_{Rr}$ by the power from the electric motor 103. In this way, during assisted traveling, a larger propulsion than that during normal traveling is achieved.

To describe the above described normal traveling and assisted traveling from the perspective of the traveling unit 12, the front wheel $12_{Fr}$ acts as a driven wheel during normal traveling, and as a drive wheel during assisted traveling. Further, the rear wheel $12_{Rr}$ acts as a drive wheel both during normal traveling and during assisted traveling. In other words, the work machine 1 is rear wheel drive during normal traveling, and four-wheel drive during assisted traveling.

The assisted traveling may be used when a certain load (for example, a relatively large acceleration) is applied on the work machine 1 as an obstructive factor against normal traveling. Examples of possible cases where assisted traveling is required include when the work machine 1 is traveling uphill (hill-climbing), when traveling is obstructed by a concavity on a traveling surface or an obstacle (for example, a stone), and when the rear wheel $12_{Rr}$ is spinning in the mud.

Figure 3A:
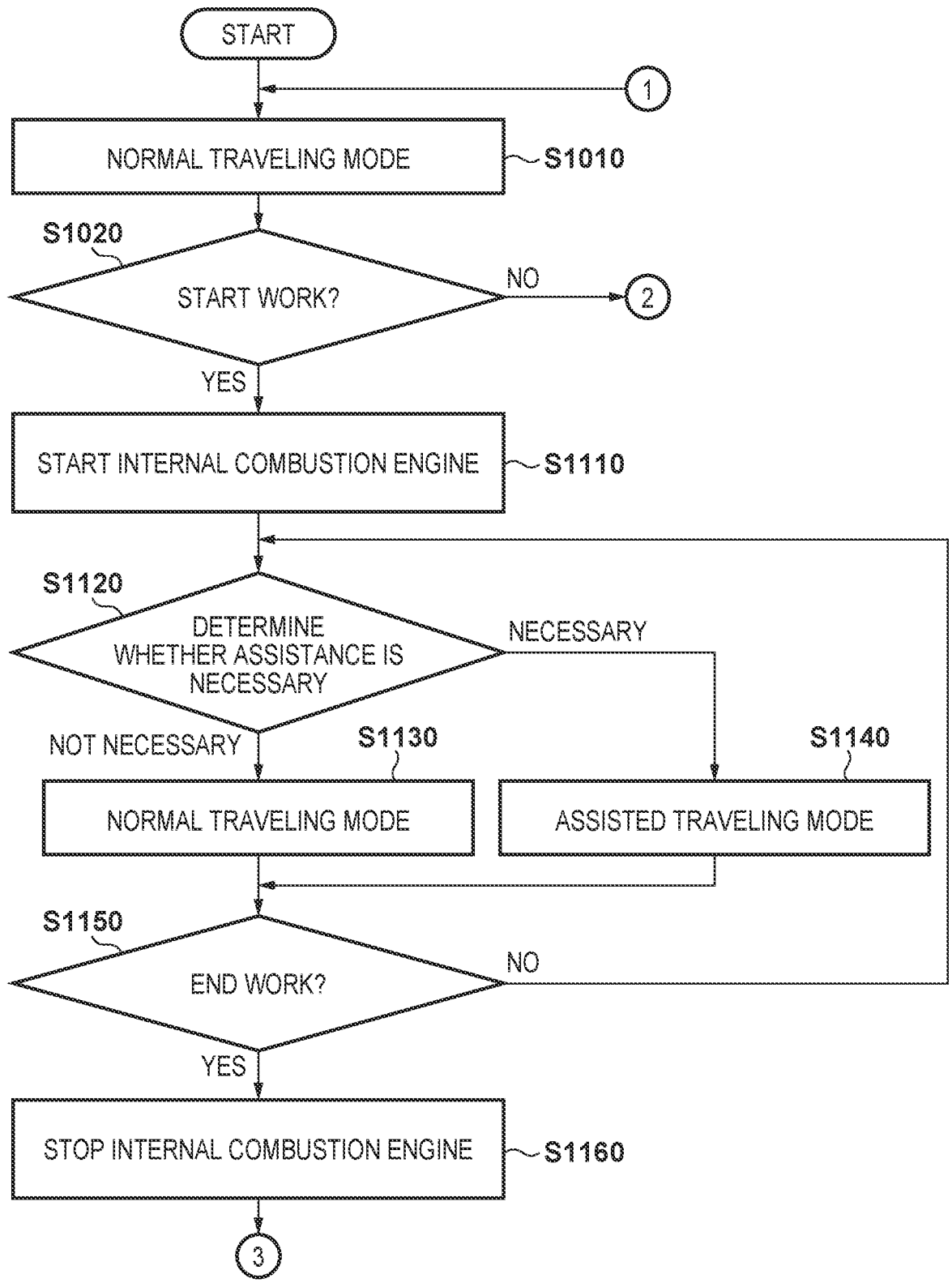
FIG. 3A is a flow chart for illustrating an example of a control method for a work machine.
Figure 3B:
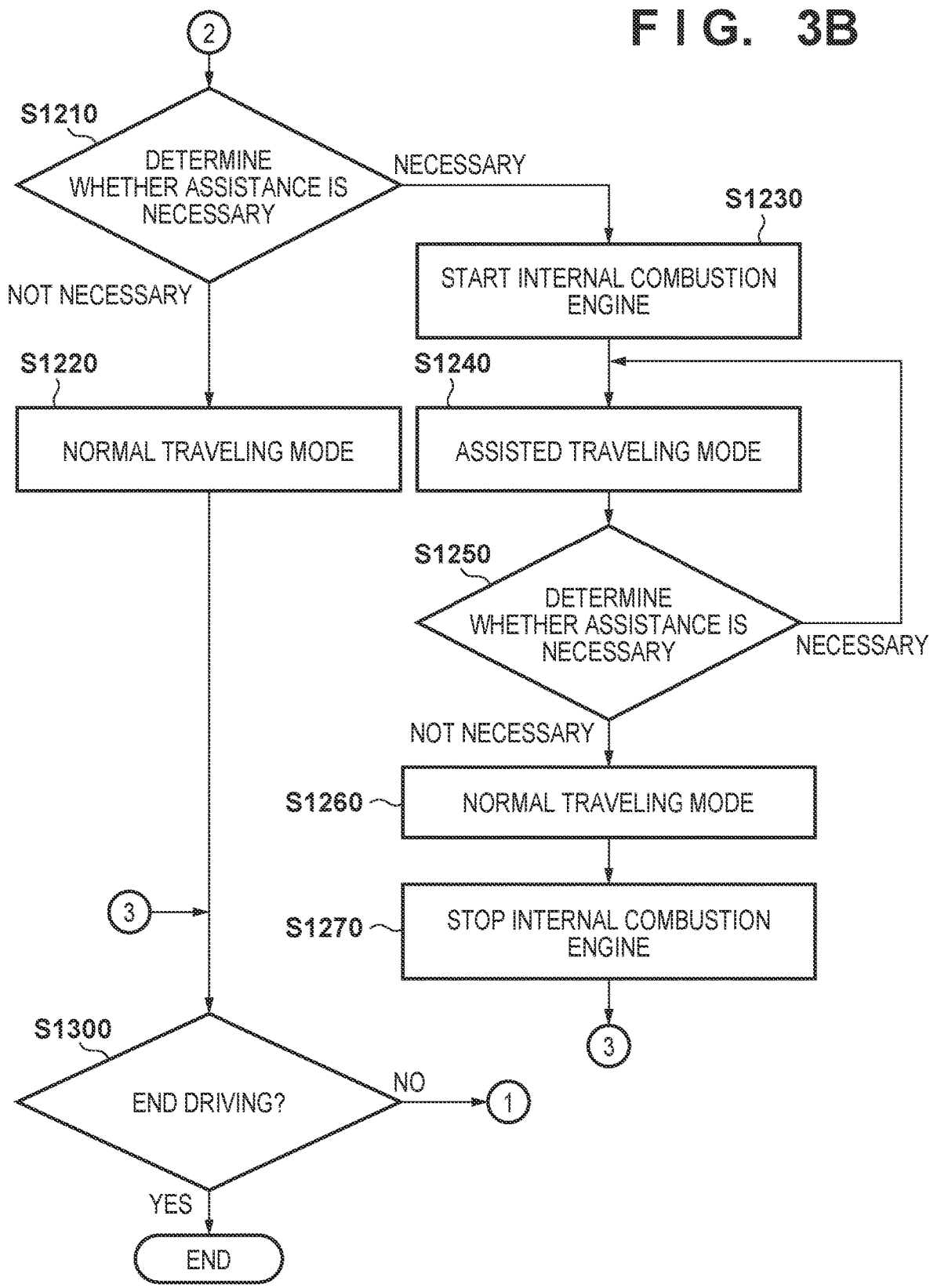
FIG. 3B is a flowchart for illustrating an example of a control method for a work machine.

FIGS. 3A and 3B illustrate a flowchart illustrating an example of a control method for the work machine 1. The flow is triggered to start by, for example, an operator getting on the work machine 1 and turning on the power supply of the work machine 1 (placing the work machine 1 into an active state). The flow is performed by the controller 107, and in summary, the work machine 1 performs assisted traveling when the work machine 1 enters a state where it cannot travel properly by being in normal traveling. Note that, in the description below, as operation modes of the work machine 1, a mode for normal traveling is represented as a normal traveling mode, and a mode for assisted traveling is represented as an assisted traveling mode.

In step S1010 (hereinafter indicated simply as "S1010" and the same is also applicable to other steps), the work machine 1 enters the normal traveling mode. In the normal traveling mode, the rear wheel $12_{Rr}$ is driven by power from the electric motor 103, and the operator can operate the operation unit 14 to cause the work machine 1 to travel along a desired path at a desired vehicle speed. Note that, in S1010, any clutches C1 to C3 described above are in open state because work is not started yet.

In S1020, it is determined whether work is to be started in a work area. The determination in S1020 is made based on an input by the operator to the work operation element on the operation unit 14. When work is to be started (for example, an operation indicative of start of work is made by the operator as an input), the process proceeds to S1110, and otherwise, to S1210.

In S1110, the engine 101 is started (placed into an active state). When the work unit 13 is to be driven, the clutch C2 is placed into the directly-connected state to transmit power from the engine 101 to the work unit 13. Additionally, the clutch C3 can be placed into the directly-connected state to generate electric power by starter-generator 106 based on power from the engine 101, so that the battery 104 can be charged.

In S1120, it is determined whether or not there is a difficulty in travel in normal traveling, that is, whether or not assisted traveling is required (hereinafter referred to as "assist necessity determination"). As described in detail later, the determination in S1120 is made based on a power consumption of the electric motor 103. For example, in the electric motor 103, the power consumption may increase with increase in the load (load torque). Accordingly, for example, when the load on the electric motor 103 is within an allowable range, it is determined that assisted traveling is not required, and the process proceeds to S1130. On the other hand, for example, when the load on the electric motor 103 is out of the allowable range, it is determined that assisted traveling is required, and the process proceeds to S1140.

In S1130, the work machine 1 is maintained in the normal traveling mode because it is determined that in S1120 assisted traveling is not required. In other words, the clutch C1 is maintained in the open state, and transmission of power from the engine 101 to the front wheel $12_{Fr}$ is kept discontinued.

In S1140, the work machine 1 is changed to the assisted traveling mode because it is determined that in S1120 assisted traveling is required. In other words, the clutch C1 is placed into the directly-connected state, so that power is to be transmitted from the engine 101 to the front wheel $12_{Fr}$.

In S1150, it is determined whether or not work is ended. The determination in S1150 is made based on an input by the operator to the work operation element on the operation unit 14. When work is ended (for example, an operation indicative of end of work is made by the operator as an input), the process proceeds to S1160, and otherwise, returns to S1120.

Here, when the process returns to S1120 while in the assisted traveling mode and it is determined that assisted traveling is not required in the assist necessity determination performed again, the work machine 1 is to be changed to the normal traveling mode. Similarly, when the process returns to S1120 while in the normal traveling mode and it is determined that assisted traveling is required in the assist necessity determination performed again, the work machine 1 is to be changed to the assisted traveling mode. Further, when the determination result obtained from the assist necessity determination performed again is the same as that from the previous assist necessity determination, the operation mode of the work machine 1 is to be maintained.

In S1160, the engine 101 is stopped to be placed in an inactive state because in S1150 work is ended. Further, before the engine 101 is stopped, the clutch C2 is placed into the open state.

To sum up, in S1110 to S1160, the work machine 1 operates the engine 101 to perform work. In other words, during normal traveling in which the electric motor 103 drives the rear wheel $12_{Rr}$, the engine 101 drives the work unit 13 to perform work. When it becomes difficult to travel in normal traveling, power from the engine 101 is transmitted to the front wheel $12_{Fr}$ for assisted traveling.

Next, in S1210, the assist necessity determination is performed. As described in detail later, the determination in S1210 may made in the same procedure as in S1120. When it is determined that assisted traveling is not required, the process proceeds to S1220, and when it is determined that assisted traveling is required, the process proceeds to S1230.

In S1220, the work machine 1 is maintained in the normal traveling mode because it is determined that in S1210 assisted traveling is not required.

In S1230, the engine 101 is started. Additionally, the clutch C3 may be placed in the directly-connected state to generate electric power by the starter-generator 106 based on power from the engine 101, so that the battery 104 can be charged. Note that since work is not started yet, the clutch C2 is maintained in the open state, and power from the engine 101 in the active state to the work unit 13 is discontinued.

In S1240, the work machine 1 is changed to the assisted traveling mode because it is determined that in S1210 assisted traveling is required. In other words, the clutch C1 is placed into the directly-connected state, so that power is to be transmitted from the engine 101 placed in the active state in S1230 to the front wheel $12_{Fr}$.

In S1250, the assist necessity determination is performed. As described in detail later, the determination in S1250 may be made in the same procedures as in S1120 and S1210. When it is determined that assisted traveling is not required, the process proceeds to S1260, and when it is determined that assisted traveling is required, the process returns to S1240.

In S1260, the work machine 1 is changed to the normal traveling mode because it is determined that in S1250 assisted traveling is not required.

In S1270, the engine 101 is stopped to be placed in the inactive state because assisted traveling is ended.

To sum up, in S1210 to S1270, the engine 101 is in the inactive state because the work machine 1 does not perform work, and normal traveling in which the electric motor 103 drives the rear wheel $12_{Rr}$ is performed. When it becomes difficult to travel in normal traveling, the engine 101 is started to transmit power from the engine 101 to the front wheel $12_{Fr}$ for assisted traveling.

In S1300, it is determined whether or not the operation of the work machine 1 is ended. The determination in S1300 may be made based, for example, on the fact that the operator turns off the power supply of the work machine 1 (placing the work machine 1 into the inactive state). When the operation is ended, the flow is to be ended, and otherwise, the process returns to S1010.

Figure 4A:
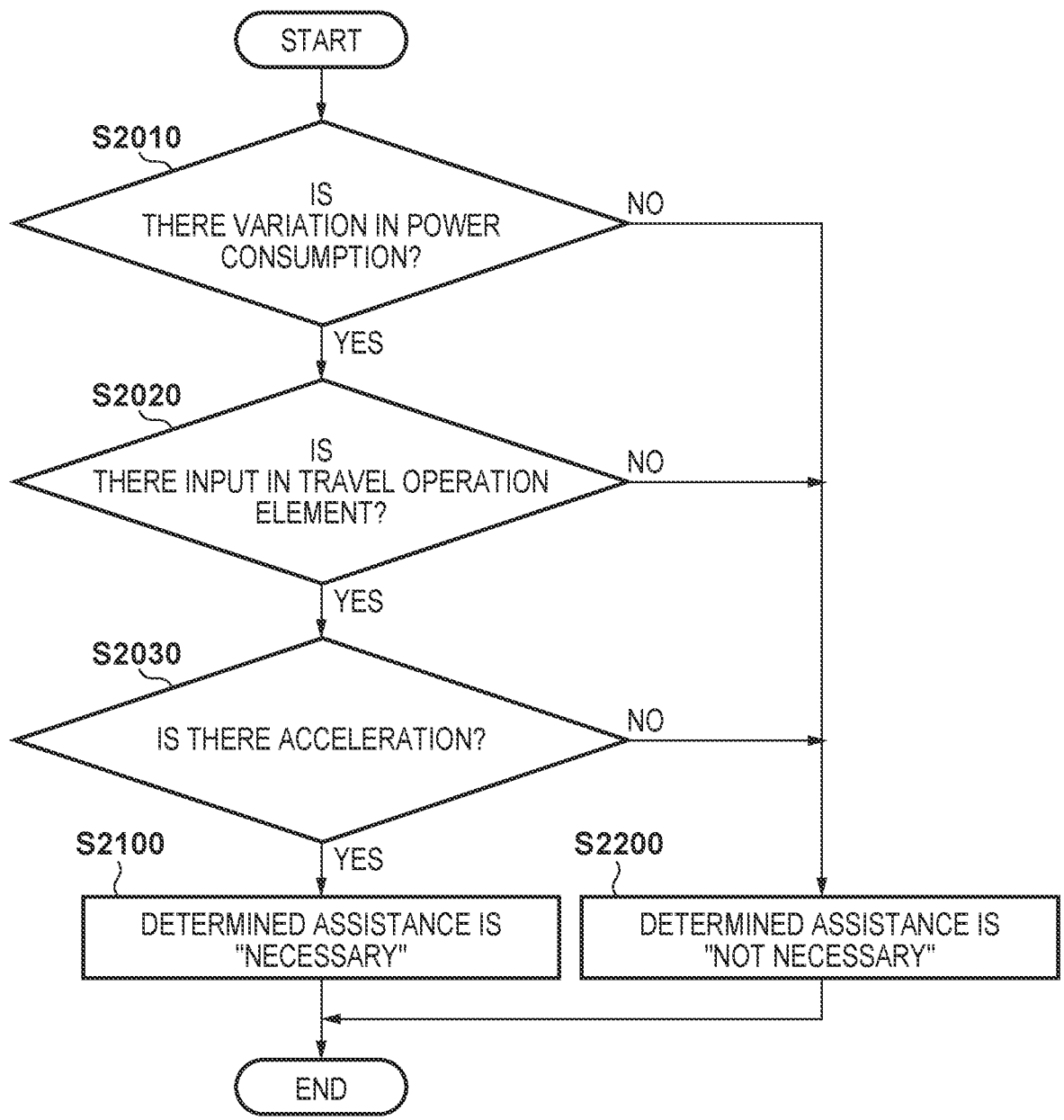
FIG. 4A is a flowchart for illustrating an example of a method for determining whether or not assistance is required.

FIGS. 4A to 4B are flow charts illustrating an example of a method for the assist necessity determination (see S1120 and the like). The flow is performed by the controller 107, and in summary, it is determined whether or not it is difficult to travel by being in normal traveling based on a power consumption of the electric motor 103, and based additionally on a vehicle state (acceleration, vehicle speed, and the like).

As described above, any suitable motor among various types of motors may be used for the electric motor 103, and any known configuration and drive method, such as those described in Japanese Patent No. 4014523, Japanese Patent No. 3674919, Japanese Patent No. 3296729, and Japanese Patent No. 6228620 may be adopted for the electric motor 103. Variation in a load on the electric motor 103 can cause the rotational speed of the electric motor 103 to deviate from a target rotational speed, leading to change in current components (for example, torque current or excitation current in an example of an induction motor). Accordingly, it is considered possible to detect a loaded state of the electric motor 103 based on the power consumption of the electric motor 103.

As an example, variation in a load on the electric motor 103 can be detected based, for example, on variation in an average value of an amount of electric current supplied to the electric motor 103 for a predetermined duration on the order of several seconds (average power consumption). In another example, it is alternatively/additionally possible to detect variation in the load based on variation in a value of voltage supplied to the electric motor 103 (power supply voltage value) because increase in the amount of electric current to the electric motor 103 causes a voltage drop.

The vehicle state (acceleration, vehicle speed, and the like) often changes with variation in the load on the electric motor 103. Accordingly, additionally detecting the vehicle state is advantageous to improve determination accuracy whether or not there is a situation where assisted traveling is required.

First, description will be made as to the flow illustrated in FIG. 4A. In S2010, it is determined whether or not there is variation in a power consumption. The determination in S2010 may, for example, be made by measuring an amount of electric current and/or a value of voltage supplied to the electric motor 103 by a predetermined instrument. The instrument or the function thereof is provided in the power control unit 105 in the embodiment, and a signal indicative of a measurement result is to be output to the controller 107. Then, determination may be made as to whether or not variation occurs in the power consumption obtained based on the measurement result, exceeding a predetermined level from a fixed value such as a theoretical value, a target value, a reference value, and an average value in a stable state. In view of this, it is considered that the controller 107 acts as a detection unit for detecting a loaded state of the electric motor 103. When there is variation in the power consumption, the process proceeds to S2020, and otherwise, to S2200.

In S2020, it is determined whether or not there is an input to the travel operation element on the operation unit 14. The determination in S2020 may be made by using, for example, a manipulated variable detection sensor (accelerator position sensor) capable of detecting a manipulated variable input to the travel operation element. The manipulated variable detection sensor is provided as part of the sensor unit 108, and when the travel operation element is operated by the operator, a signal indicative of the manipulated variable is to be output to the controller 107. When there is an input exceeding a predetermined level to the travel operation element, the process proceeds to S2030, and otherwise, to S2200.

In S2030, it is determined whether or not the work machine 1 is experiencing an acceleration in the vehicle body longitudinal direction. The determination in S2030 may be made by using, for example, an acceleration sensor capable of detecting an acceleration applied to the vehicle body 10, a gyro sensor capable of detecting a posture of the vehicle body 10, or the like. These sensors are provided as part of the sensor unit 108, and signals indicative of measurement results from the sensors are to be output to the controller 107. When there is an acceleration in the vehicle body longitudinal direction exceeding a predetermined level, the process proceeds to S2100, and otherwise, to S2200.

In S2100, it is determined that assisted traveling is required, and in S2200, it is determined that assisted traveling is not required.

Here, after determination is made as to variation in the power consumption in S2010, determination is made as to an input to the travel operation element in S2020, and further determination is made as to an acceleration in S2030, so that the traveling state of the work machine 1 can be relatively easily determined. For example, even when there is variation in the power consumption of the electric motor 103 in S2010, there is no need to cause the work machine 1 to travel without an input to the travel operation element in S2020, and there may be a case where the variation in the power consumption may result from other causes than hill-climbing or the like. Accordingly, it is possible to properly determine whether or not there is a situation where assisted traveling is required due to, for example, hill-climbing or the like by further determining whether or not the work machine 1 is experiencing an acceleration in the subsequent step S2030.

However, when it is determined that the power consumption varies in S2010, it is conceivable that the electric motor 103 may be subjected to at least an unexpected load. Accordingly, steps S2020 to S2030 may be omitted depending of specifications or the like.

Next, description will be made as to another flow illustrated in FIG. 4B. An example in FIG. 4B is different from FIG. 4A in that step S2040 is performed instead of step S2030, and since steps S2010, S2020, S2100, and S2200 are similar to those in FIG. 4A, description thereof is omitted here.

In S2040, it is determined whether or not the vehicle speed of the work machine 1 is within a target range. The determination in S2040 may be made by using, for example, a vehicle speed sensor, and determination may be made as to, for example, whether or not the vehicle speed corresponds to a manipulated variable input to the travel operation element (whether the vehicle speed does not deviate largely from a target value). The vehicle speed sensor is provided as part of the sensor unit 108, and a signal indicative of a detection result from the sensor is to be output to the controller 107.

Here, after determination is made as to variation in the power consumption in S2010, determination is made as to an input to the travel operation element in S2020, and further determination is made as to a vehicle speed in S2030, so that the traveling state of the work machine 1 can be relatively easily determined. An example of possible cases where travel assistance is required includes when the rear wheel $12_R$r, which is a drive wheel in the embodiment, is spinning in the mud. In such a case, the flow in FIG. 4B is suitable. Note that when the rear wheel $12_{Rr}$ is spinning, the electric motor 103 is not loaded substantially (alternatively, the load is much smaller than a general load during traveling in a work area). Accordingly, variation in the power consumption may occur under such circumstances.

Here, when the rear wheel $12_{Rr}$ is spinning, it is not possible by measuring the vehicle speed based on the rotational speed of the rear wheel $12_{Rr}$ to properly determine whether or not travel assistance is required. Accordingly, the vehicle speed sensor may measure the vehicle speed based on the rotational speed of the front wheel $12_{Fr}$, which is a driven wheel at least during normal traveling. Alternatively, the vehicle speed sensor may be provided in such a way that a relative speed of the vehicle body 10 to the travel path can be detected.

The method for the assist necessity determination is not limited to the above-described example, and for example, it may be a combination of the flows in FIGS. 4A and 4B, or may have other determination steps added thereto, such as determination of a battery remaining amount and travel path conditions (slippage for the traveling unit 1).

FIG. 5 is a timing chart illustrating an example of a control method for the work machine 1. The axis of abscissas in the figure is a time axis. The axis of ordinates illustrates "amount of electric current (average value)" and "power supply voltage value" supplied to the electric motor 103, "manipulated variable to travel operation element" of the operation unit 14 input by the operator, "vehicle speed" of the work machine 1, and states of the clutches C1 to C3.

It is assumed here that the work machine 1 is working already in the normal traveling mode, that is, a predetermined manipulated variable is input to the travel operation element, the work machine 1 is traveling at a substantially constant vehicle speed with an amount of electric current $I_{AVE}$ and a power supply voltage value V1 of the electric motor 103. Further, it is assumed that the clutch C1 is in the open state, and the clutches C2 to C3 are in the directly-connected state.

It is assumed in the example that at time t100, upon entering a hill-climbing state, the vehicle speed falls to 0 [km/h] even though the manipulated variable to the travel operation element is maintained. This implies that it becomes difficult to travel by the propulsion in the normal traveling mode. In this case, a load on the electric motor 103 increases, and the amount of electric current of the electric motor 103 correspondingly increases from $I_{AVE}$. Further, the power supply voltage value of the electric motor 103 may correspondingly exhibit a voltage drop.

At time t10, in response to the amount of electric current of the electric motor 103 increasing above a reference current value $I_{REF1}$ (reaching $I_{REF1}$), the clutch C1 is placed into the directly-connected state to transmit power from the engine 101 to the front wheel $12_{Fr}$. As a result, assisted traveling is performed in duration from time t110 to the subsequent time t120. The load on the electric motor 103 is correspondingly reduced, the amount of electric current of the electric motor 103 decreases, and the power supply voltage value of the electric motor 103 approaches the original state (V1).

At time t120, in response to the amount of electric current of the electric motor 103 reaching a reference current value $I_{REF2}$ that is smaller than $I_{REF1}$ described above, the clutch C1 is placed into the open state to discontinue power from the engine 101 to the front wheel $12_{Fr}$. As a result, the assisted traveling mode is released, and normal traveling is resumed.

At time t130, hill-climbing is substantially completed (alternatively, it is sufficiently possible to climb uphill), and the work machine 1 continues to travel at a substantially constant vehicle speed again.

According to the example, assisted traveling is performed in response to the amount of electric current of the electric motor 103 exceeding $I_{REF1}$, and normal traveling is resumed in response to the amount of electric current reaching $I_{REF2}$. Accordingly, assisted traveling is performed when a propulsion is required (for example, at the beginning of hill-climbing), and normal traveling is performed at the completion of the hill-climbing (alternatively, when it is sufficiently possible to climb uphill) when the relatively large propulsion is no longer required. In this way, normal traveling and assisted traveling are to be properly switched.

The waveforms in the figure are schematically drawn, and may be different from those in the above example depending on the configuration of the electric motor 103 and the driving manner thereof. Accordingly, the controlling manner of the clutch C1 by the controller 107 is not limited to that in the above example, and any other reference value may be used to control the clutch C1.

In another example, at time 1110, in response to the power supply voltage value of the electric motor 103 falling below a reference voltage value $V_{REF1}$ (reaching $V_{REF1}$), the clutch C1 may be placed into the directly-connected state to start assisted traveling, for example. Then, at time t20, in response to the power supply voltage value of the electric motor 103 reaching a reference voltage value $V_{REF2}$ that is higher than $V_{REF1}$ described above, the clutch C1 may be placed into the open state to resume normal traveling.

Figure 6:
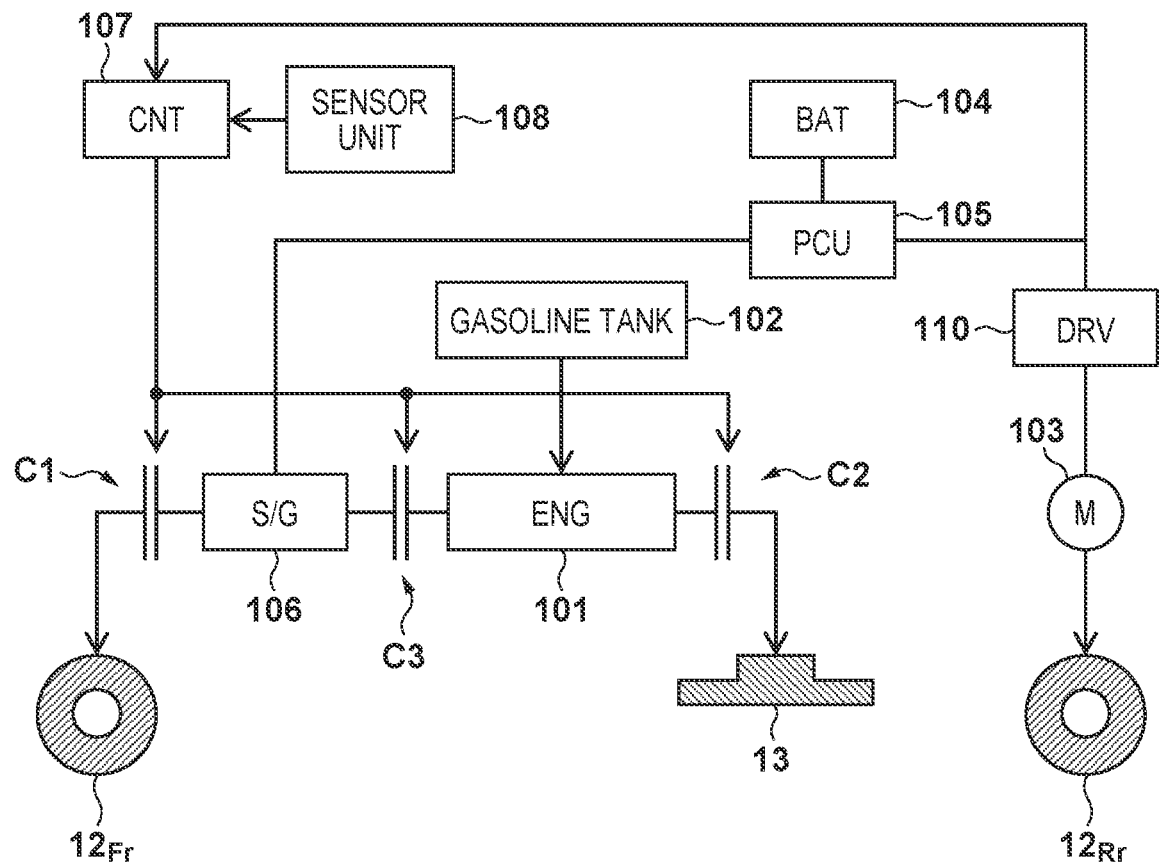
FIG. 6 is a block diagram for illustrating an example of a system configuration of a work machine.

As still another example, as illustrated in FIG. 6, a motor driver 110 may be used to drive the electric motor 103 by a driving force corresponding to the loaded state of the electric motor 103. Any known motor driver may be used for the motor driver 110, such as those that perform feedback control (what is called vector control) on the driving force from the electric motor 103 by analyzing current components of the driven electric motor 103. In this case, the controller 107 may control the clutch C1 based on a signal from the motor driver 110. Note that the function of such a motor driver 110 may be provided in the power control unit 105.

As described above, according to the embodiment, the work machine 1 includes the engine 101 configured to generate power for driving the work unit 13, the electric motor 103 configured to generate power for driving the rear wheel 12a, among the front wheel $12_{Fr}$ and the rear wheel $12_{Rr}$, and the clutch C1. The clutch C1 is arranged to be switchable between transmission and discontinuation of power from the engine 101 to the front wheel $12_{Fr}$ based on a loaded state of the electric motor 103. In other words, the electric motor 103 is arranged as a power source dedicated to the rear wheel $12_{Rr}$, while the engine 101 is arranged to be able to transmit power also to the front wheel $12_{Fr}$ as necessary on the premise that it is a power source for the work unit 13. Accordingly, according to the embodiment, it is possible to provide a vehicle body structure capable of selectively switching between normal traveling and assisted traveling in a relatively simple configuration. Note that in the embodiment, the electric motor 103 drives the rear wheel 12$_{Rr}$, and the engine 101 drives the front wheel 12$_{Fr}$ as necessary. However, in another embodiment, the engine 101 and the electric motor 103 may drive vice versa.

The work machine 1 further includes the controller 107 as a switching control unit for controlling the clutch C1 based on a power consumption of the electric motor 103. The electric motor 103 may be subjected to variation in a power consumption with variation in the load (the power consumption may increase with increase in the load). Since the clutch C1 is controlled by the controller 107 based on the power consumption, normal traveling and assisted traveling can be switched in a relatively simple configuration and in a proper situation according to the embodiment.

The configuration of the work machine 1 in which the above-described controlling manner by the controller 107 can be achieved is not limited to the example in FIG. 2, and any change or addition may be made to the arrangement of each element (vehicle components) in the figure as necessary. For example, a predetermined transmission such as HST (Hydrostatic Transmission) and CVT (Continuously Variable Transmission) may be arranged between the engine 101 and the work unit 13 and/or between the engine 101 and the front wheel 12$_{Fr}$, as necessary.

Figure 7:
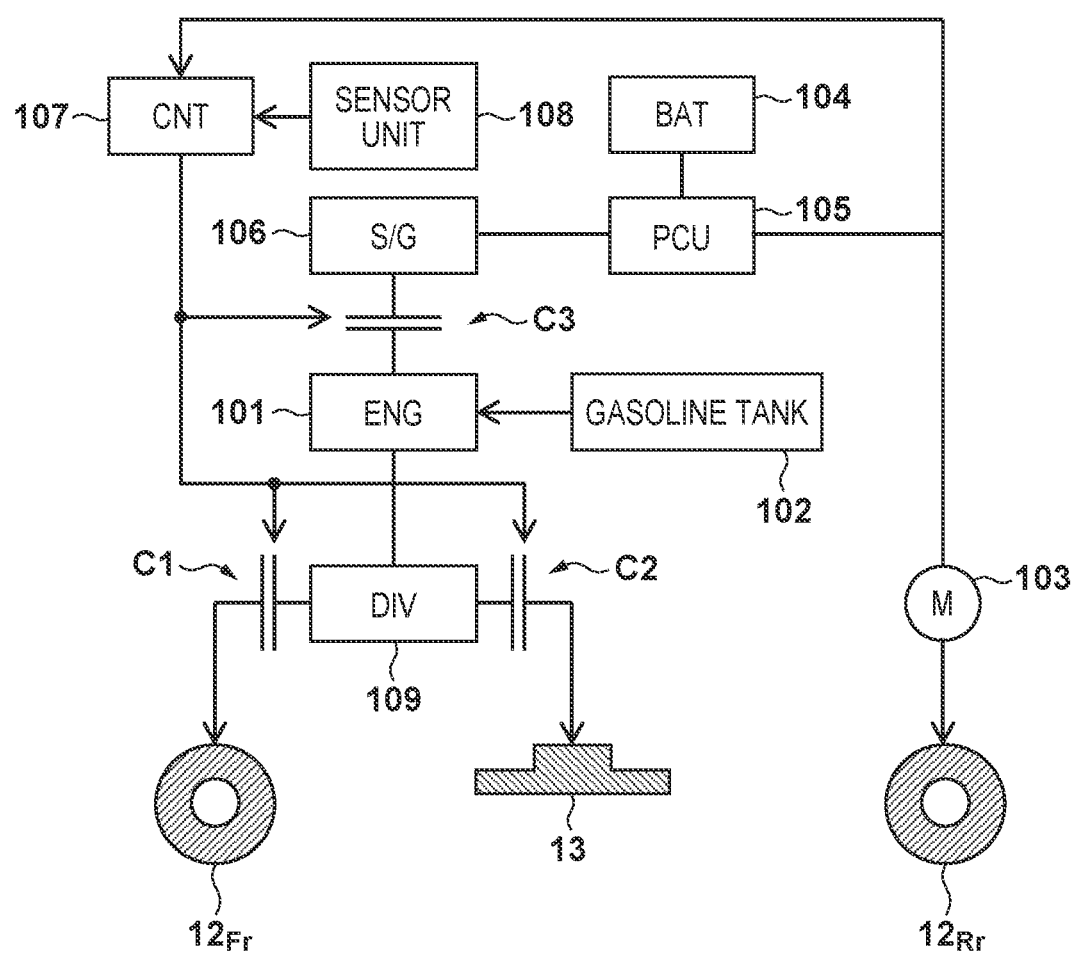
FIG. 7 is a block diagram for illustrating an example of a system configuration of a work machine.

For example, as illustrated in FIG. 7, a power dividing mechanism 109 may be provided between the engine 101 and the work unit 13 and between the engine 101 and the front wheel 12$_{Fr}$. In this way, the vehicle body structure can be designed, balancing power transmitted to the work unit 13 with power transmitted to the front wheel 12$_{Fr}$. Further, the starter-generator 106 and the clutch C3 may be arranged on an opposite side of the engine 101 from the front wheel 12$_{Fr}$.

In the above embodiment, the aspect in which the clutch C1 is controlled by the controller 107 based on the power consumption of the electric motor 103 is illustrated. However, the clutch C1 may be mechanically/electrically controlled in response to the operator operating a predetermined operation element of the operation unit 14. For example, the clutch C1 may be placed into the connected state in response to the operator operating a lever/pressing a switch to perform assisted traveling. In this way, it is possible for the operator to start assisted traveling on the operator's own will instead of being controlled by the controller 107.

In the above embodiment, the work machine 1 is illustrated as a passenger vehicle. However, the work machine 1 may be of an unmanned travel type. Further, the work machine 1 is not limited to a lawnmower, and the specifics of the embodiment may be applicable to a snowplow provided with an auger serving as the work unit 13, or a farm work machine such as a cultivator.

Features of the above embodiment will be summarized below.

A first aspect relates to a work machine (for example, 1) the work machine includes: a work unit (for example, 13) that performs work on a travel path; an internal combustion engine (for example, 101) configured to generate power for driving the work unit; a traveling unit (for example, 12) including a front wheel (for example, 12$_{Fr}$) and a rear wheel (for example, 12$_{Rr}$); an electric motor (for example, 103) configured to generate power for driving a first wheel (for example, 12$_{Fr}$) of the front wheel and the rear wheel; a first clutch (for example, C1) for switching between transmission and discontinuation of the power from the internal combustion engine to a second wheel (for example, 12$_{Fr}$) of the front wheel and the rear wheel; and a switching control unit (for example, 107) configured to control the first clutch based on a power consumption of the electric motor for switching between the transmission and the discontinuation.

According to the first aspect, normal traveling in which the first wheel is driven by the electric motor and assisted traveling in which the second wheel is driven by the internal combustion engine additionally to assist the normal traveling can selectively be performed. The assisted traveling is performed, for example, during hill-climbing, and during assisted traveling, power from the internal combustion engine is transmitted to the second wheel through the first clutch in addition to driving the first wheel with the electric motor, causing the work machine to properly travel by generating a larger propulsion than that during normal traveling. Further, according to the first aspect, the electric motor is arranged as a power source dedicated to the first wheel (for example, rear wheel), while the internal combustion engine is arranged to be able to transmit power also to the second wheel (for example, front wheel) as necessary on the premise that it is a power source for the work unit. Accordingly, according to the first aspect, it is possible to provide a vehicle body structure capable of selectively performing normal traveling and assisted traveling in a relatively simple configuration. Here, in the electric motor, a power consumption may increase with increase in a load. According to the first aspect, since the first clutch is controlled by the switching control unit based on the power consumption, normal traveling and assisted traveling can be switched in a relatively simple configuration and in a proper situation.

In a second aspect, the switching control unit controls the first clutch based on variation in an average value of an amount of electric current supplied to the electric motor for a predetermined duration.

According to the second aspect, normal traveling and assisted traveling are switched based on variation in an average value of an amount of electric current supplied to the electric motor. In this way, switching between normal traveling and assisted traveling in a proper situation can be relatively easily performed.

In a third aspect, the switching control unit places the first clutch into a transmission state in response to the average value of the amount of electric current supplied to the electric motor exceeding a first reference current value (for example, $I_{REF1}$), and thereafter, places the first clutch into a discontinuation state in response to the average value reaching a second reference current value (for example, $I_{REF2}$) that is smaller than the first reference current value.

According to the third aspect, for example during hill-climbing, assisted traveling is performed at the beginning of the hill-climbing when a relatively large propulsion is required, and normal traveling is performed at the completion of the hill-climbing when the relatively large propulsion is no longer required. In this way, normal traveling and assisted traveling can be properly switched.

In a fourth aspect, the switching control unit controls the first clutch based on variation in a value of voltage supplied to the electric motor.

According to the fourth aspect, normal traveling and assisted traveling are switched based on variation in a power supply voltage for electric motor. In this way, switching between normal traveling and assisted traveling in a proper situation can be relatively easily performed.

In a fifth aspect, the switching control unit places the first clutch into a transmission state in response to the value of the voltage supplied to the electric motor falling below a first reference voltage value (for example, $V_{REF1}$), and thereafter places the first clutch into a discontinuation state in response to the value of the voltage reaching a second reference voltage value (for example, $V_{REF2}$) that is higher than the first reference voltage value.

According to the fifth aspect, for example during hill-climbing, assisted traveling is performed at the beginning of the hill-climbing when a relatively large propulsion is required, and normal traveling is performed when the relatively large propulsion is no longer required (when it is sufficiently possible to climb uphill or at the completion of the hill-climbing). In this way, normal traveling and assisted traveling can be properly switched.

In a sixth aspect, the switching control unit acts as a detection unit (for example, 107) for detecting a loaded state of the electric motor.

According to the sixth aspect, normal traveling and assisted traveling can be properly switched depending on the loaded state of the electric motor.

In a seventh aspect, the work machine further includes a motor driver (for example, 110, 105) configured to drive the electric motor by a driving force corresponding to a loaded state of the electric motor, and the switching control unit controls the first clutch based on a signal from the motor driver.

According to the seventh aspect, by using a known motor driver that performs feedback control such as vector control, normal traveling and assisted traveling can be switched in a relatively simple configuration.

In an eighth aspect, the work machine further includes a travel operation element (for example, 14) for operating the traveling unit, and the switching control unit controls the first clutch based on a manipulated variable input to the travel operation element and a vehicle speed of the work machine.

According to the eighth aspect, normal traveling and assisted traveling can be further properly switched by further referencing the manipulated variable and the vehicle speed. For example, when the vehicle speed does not correspond to the manipulated variable to the travel operation element (when the vehicle speed deviates largely from a target value), it is conceivable that the electric motor may be subjected to an unexpected load, and in that case, assisted traveling is to be performed.

In a ninth aspect, the work machine further includes an acceleration sensor (for example, 108) configured to detect an acceleration applied to the work machine, and the switching control unit controls the first clutch further based on a detection result from the acceleration sensor.

According to the ninth aspect, normal traveling and assisted traveling can be further properly switched by further referencing the acceleration applied to the work machine. For example, when a predetermined acceleration is generated in a vehicle body longitudinal direction in a relatively short duration, it is conceivable that any obstacle may prevent traveling by the traveling unit, and in that case, assisted traveling is to be performed.

The present invention is not limited to the above embodiments and various changes and modifications can be made within the spirit and scope of the present invention. Therefore, to apprise the public of the scope of the present invention, the following claims are made.

The invention claimed is:

1. A work machine, comprising:
a work unit that performs work on a travel path;
an internal combustion engine configured to generate power for driving the work unit;
a traveling unit including a front wheel and a rear wheel;
an electric motor configured to generate power for driving a first wheel which is one of the front wheel and the rear wheel;
a first clutch provided in a power transmission path between the internal combustion engine and a second wheel which is the other of the front wheel and the rear wheel, configured to be switched between a transmission state and a discontinuation state of the power transmission path; and
a switching control unit configured to control the first clutch such that the first clutch switches between the transmission state and the discontinuation state.

2. The work machine according to claim 1, wherein the switching control unit controls the first clutch based on a power consumption of the electric motor.

3. The work machine according to claim 2, wherein the switching control unit controls the first clutch based on variation in an average value of an amount of electric current supplied to the electric motor for a predetermined duration.

4. The work machine according to claim 3, wherein the switching control unit places the first clutch into the transmission state in response to the average value of the amount of electric current supplied to the electric motor exceeding a first reference current value, and thereafter, places the first clutch into the discontinuation state in response to the average value reaching a second reference current value that is smaller than the first reference current value.

5. The work machine according to claim 2, wherein the switching control unit controls the first clutch based on variation in a value of voltage supplied to the electric motor.

6. The work machine according to claim 5, wherein the switching control unit places the first clutch into the transmission state in response to the value of the voltage supplied to the electric motor falling below a first reference voltage value, and thereafter places the first clutch into the discontinuation state in response to the value of the voltage reaching a second reference voltage value that is higher than the first reference voltage value.

7. The work machine according to claim 2, wherein the switching control unit acts as a detection unit for detecting a loaded state of the electric motor based on the power consumption.

8. The work machine according to claim 2, wherein the work machine further comprises a motor driver configured to drive the electric motor by a driving force corresponding to a loaded state of the electric motor, and
the switching control unit controls the first clutch based on a signal from the motor driver.

9. The work machine according to claim 2, wherein the work machine further comprises a travel operation element for operating the traveling unit, and
the switching control unit controls the first clutch further based on a manipulated variable input to the travel operation element and a vehicle speed of the work machine.

10. The work machine according to claim 9, wherein
the work machine further comprises a vehicle speed sensor configured to detect the vehicle speed of the work machine, and
the vehicle speed sensor measures a rotational speed of the second wheel.

11. The work machine according to claim 2, wherein
the work machine further comprises an acceleration sensor configured to detect an acceleration applied to the work machine, and
the switching control unit controls the first clutch further based on a detection result from the acceleration sensor.

12. The work machine according to claim 1, the work machine further comprises, as an operation mode,
a normal traveling mode for driving the first wheel based on the power of the electric motor; and
an assisted traveling mode for driving the first wheel based on the power of the electric motor, with driving the second wheel based on the power of the internal combustion engine by controlling the first clutch by the switching control unit to switch the first clutch to the transmission state.

13. The work machine according to claim 12, wherein
the operation mode shifts from the normal traveling mode to the assisted traveling mode in a case where a load of the electric motor is out of an allowable range.

14. The work machine according to claim 1, wherein
the work machine further comprises:
a battery; and
a starter configured to aid the internal combustion engine in starting based on an electric power of the battery.

15. The work machine according to claim 14, wherein
the work machine further comprises a second clutch configured to connect the starter to the internal combustion engine.

16. The work machine according to claim 14, wherein
the starter is provided so as to be closer to the internal combustion engine with respect to the first clutch.

17. The work machine according to claim 1, wherein
the work machine further comprises an operation unit configured to receive an input from an operator, and
the first clutch is configured to be mechanically/electrically controlled in response to the operator operating a predetermined operation element of the operation unit.

\* \* \* \* \*